United States Patent
Zhao et al.

(10) Patent No.: US 11,068,218 B2
(45) Date of Patent: Jul. 20, 2021

(54) IMAGING METHOD, IMAGING DEVICE AND IMAGING SYSTEM FOR VERIFYING MOBILE TERMINAL IDENTIFICATION AND SELECTING APPROPRIATE IMAGING DEVICE

(71) Applicant: Zhuhai Pantum Electronics Co., Ltd., Zhuhai (CN)

(72) Inventors: Wei Zhao, Zhuhai (CN); Yinggui Chen, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 16/905,619

(22) Filed: Jun. 18, 2020

(65) Prior Publication Data
US 2020/0319832 A1 Oct. 8, 2020

Related U.S. Application Data

(63) Continuation of application No. PCT/CN2018/119186, filed on Dec. 4, 2018.

(30) Foreign Application Priority Data

Dec. 20, 2017 (CN) .......................... 201711386987.5

(51) Int. Cl.
G06F 3/12 (2006.01)
H04N 1/333 (2006.01)
H04W 12/71 (2021.01)

(52) U.S. Cl.
CPC .......... *G06F 3/1269* (2013.01); *G06F 3/1238* (2013.01); *G06F 3/1287* (2013.01);
(Continued)

(58) Field of Classification Search
None
See application file for complete search history.

(56) References Cited

U.S. PATENT DOCUMENTS

| 8,941,872 B1* | 1/2015 | Lellouche .......... G06Q 30/0207 358/1.15 |
| 2012/0243038 A1* | 9/2012 | Saeda .................... G06F 3/1267 358/1.15 |

(Continued)

FOREIGN PATENT DOCUMENTS

| CN | 103685176 A | 3/2014 |
| CN | 103942016 A | 7/2014 |

(Continued)

OTHER PUBLICATIONS

The World Intellectual Property Organization (WIPO) International Search Report for PCT/CN2018/119186 dated Mar. 6, 2019 6 Pages (including translation).

*Primary Examiner* — Haris Sabah
(74) *Attorney, Agent, or Firm* — Anova Law Group, PLLC

(57) ABSTRACT

An imaging method, an imaging device and an imaging system are provided. The imaging method includes: when receiving a terminal identification sent by a mobile terminal and directed to the mobile terminal, sending, by an imaging device, an imaging request message to a cloud server. The imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device: and when receiving the imaging job sent by the cloud server, performing, by the imaging device, the imaging task according to the imaging job.

13 Claims, 6 Drawing Sheets

---

When receiving a terminal identification sent by a mobile terminal and belonged to the mobile terminal, sending, by an imaging device, an imaging request message to a cloud server, where the imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device ~ 101

When receiving the imaging job sent by the cloud server, performing, by the imaging device, the imaging task according to the imaging job ~ 102

Sending, by the imaging device, status information of the imaging device and/or status information of the imaging task in the process of performing the imaging task to the cloud server, for the cloud server to forward the status information of the imaging device and/or the status information of the imaging task to the mobile terminal. ~ 103

(52) U.S. Cl.
CPC .......... *G06F 3/1292* (2013.01); *G06F 3/1294* (2013.01); *H04N 1/33323* (2013.01); *H04W 12/71* (2021.01)

(56) References Cited

U.S. PATENT DOCUMENTS

| | | | | |
|---|---|---|---|---|
| 2013/0215446 A1* | 8/2013 | Imai | ................... | H04N 1/4433 358/1.13 |
| 2015/0092233 A1* | 4/2015 | Park | ................... | H04N 1/00307 358/1.15 |
| 2015/0339561 A1* | 11/2015 | Takenaka | ................. | G06F 1/00 358/1.14 |
| 2016/0072975 A1* | 3/2016 | Fujioka | ................ | H04N 1/4413 358/1.14 |

FOREIGN PATENT DOCUMENTS

| | | | |
|---|---|---|---|
| CN | 104346106 | A | 2/2015 |
| CN | 104639656 | A | 5/2015 |
| CN | 105224789 | A | 1/2016 |
| CN | 106355782 | A | 1/2017 |
| CN | 106462366 | A | 2/2017 |
| CN | 106898173 | A | 6/2017 |
| CN | 108055422 | A | 5/2018 |
| WO | 2004114194 | A1 | 12/2004 |

\* cited by examiner

When receiving a terminal identification sent by a mobile terminal and belonged to the mobile terminal, sending, by an imaging device, an imaging request message to a cloud server, where the imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device ~ 101

When receiving the imaging job sent by the cloud server, performing, by the imaging device, the imaging task according to the imaging job ~ 102

Figure 1

When receiving a terminal identification sent by a mobile terminal and belonged to the mobile terminal, sending, by an imaging device, an imaging request message to a cloud server, where the imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device ~ 101

When receiving the imaging job sent by the cloud server, performing, by the imaging device, the imaging task according to the imaging job ~ 102

Sending, by the imaging device, status information of the imaging device and/or status information of the imaging task in the process of performing the imaging task to the cloud server, for the cloud server to forward the status information of the imaging device and/or the status information of the imaging task to the mobile terminal. ~ 103

Figure 2

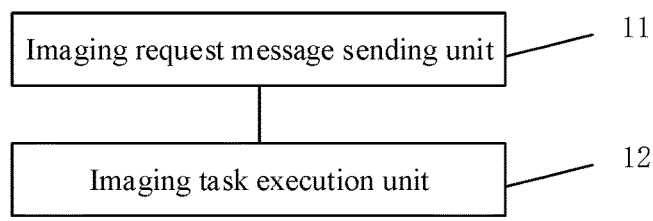

Figure 3

IMAGING METHOD, IMAGING DEVICE AND IMAGING SYSTEM FOR VERIFYING MOBILE TERMINAL IDENTIFICATION AND SELECTING APPROPRIATE IMAGING DEVICE

CROSS-REFERENCES TO RELATED APPLICATIONS

This application is a continuation application of PCT Patent Application No. PCT/CN2018/119186, filed on Dec. 4, 2018, which claims the priority of Chinese patent application No. 201711386987.5, filed on Dec. 20, 2017, the entirety of all of which is incorporated herein by reference.

FIELD OF THE DISCLOSURE

The present disclosure generally relates to the field of imaging technology and, more particularly, relates to an imaging method, an imaging device and an imaging system.

BACKGROUND

An imaging device includes a printer, a copier, a scanner, a fax machine, and a multifunctional integrated machine that integrates functions such as printing, copying, scanning, and faxing, etc. The imaging device is communicatively connected to a cloud server, and performs an imaging task according to an imaging job sent by the cloud server. The imaging job in the cloud server can be sent by a mobile terminal communicatively connected to the cloud server.

The process of performing the imaging task by the imaging device includes an ordinary operation mode and a safe operation mode. The ordinary operation mode includes that the imaging device does not perform identity verification on the mobile terminal, and directly performs the imaging task according to the imaging job sent by the mobile terminal through the cloud server. The safe operation method includes that the imaging device verifies the identity of the mobile terminal or a mobile terminal user. At present, the verification method mainly includes that the user enters a password on the imaging device, and after verifying that the password is correct, the imaging device performs the imaging task. The above-mentioned safe operation method requires the user to manually enter the password on the imaging device. On the one hand, the imaging process is substantially poor in convenience and substantially slow. On the other hand, the user has to keep the password in mind, and when once forgotten, cannot control the imaging device to perform the imaging task. Moreover, when being faced with a plurality of imaging devices, the user holding the mobile terminal will be substantially confused when selecting an imaging device due to unfamiliarity with the operating status and performance of each imaging device and cumbersome operations. A technology capable of quickly and automatically selecting an imaging device and quickly starting secure printing is needed. The disclosed method and device are directed to solve one or more problems set forth above and other problems in the art.

BRIEF SUMMARY OF THE DISCLOSURE

One aspect of the present disclosure includes an imaging method. The imaging method includes when receiving a terminal identification sent by a mobile terminal and directed to the mobile terminal, sending, by an imaging device, an imaging request message to a cloud server. The imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device. The imaging method also includes when receiving the imaging job sent by the cloud server, performing, by the imaging device, the imaging task according to the imaging job.

In one embodiment, the communication parameter includes a communication distance, communication signal strength, a communication responding speed, or a communication method.

In one embodiment, before receiving the terminal identification sent by the mobile terminal and directed to the mobile terminal, the imaging method further includes sending out, by the imaging device, a broadcast message to enable the mobile terminal to send the terminal identification to the imaging device after receiving the broadcast message. Alternatively, the imaging method includes establishing, by the imaging device, a communication connection with the mobile terminal to enable the mobile terminal to send the terminal identification directed to the mobile terminal to the imaging device.

In one embodiment, after performing, by the imaging device, the imaging task according to the imaging job, the imaging method includes sending, by the imaging device, status information of the imaging device and/or status information of the imaging task in the process of performing the imaging task to the cloud server, for the cloud server to forward the status information of the imaging device and/or the status information of the imaging task to the mobile terminal.

In one embodiment, the imaging request message further includes device information of the imaging device, used for the cloud server to send the device information corresponding to the imaging device to perform the imaging task to the mobile terminal.

Another aspect of the present disclosure includes an imaging device. The imaging device includes an imaging request message sending unit and an imaging task execution unit. The imaging request message sending unit is configured to when receiving a terminal identification sent by a mobile terminal and directed to the mobile terminal, send an imaging request message to a cloud server. The imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device. The imaging task execution unit is configured to when receiving the imaging job sent by the cloud server, perform the imaging task according to the imaging job.

In one embodiment, the imaging device further includes a broadcast message sending unit and a communication connection unit. The broadcast message sending unit is configured to send a broadcast message to enable the mobile terminal to send the terminal identification to the imaging device after receiving the broadcast message. The communication connection unit is configured to establish a communication connection with the mobile terminal to enable the mobile terminal to send the terminal identification directed to the mobile terminal to the imaging device.

In one embodiment, the imaging request message sending unit is further configured to send status information of the imaging device and/or status information of the imaging task in the process of performing the imaging task to the cloud server, for the cloud server to forward the status information of the imaging device and/or the status information of the imaging task to the mobile terminal.

In one embodiment, the imaging request message further includes device information of the imaging device, used for the cloud server to send the device information corresponding to the imaging device to perform the imaging task to the mobile terminal.

In one embodiment, the communication parameter includes a communication distance, communication signal strength, a communication responding speed, or a communication method.

Another aspect of the present disclosure includes an imaging method. The method includes receiving, by a cloud server, a request message. The request message includes a device identification of an external device; or a terminal identification of a mobile terminal and a communication parameter for communicating with the mobile terminal. The method also includes when receiving the device identification, verifying, by the cloud server, the external device corresponding to the device identification according to the received device identification, and using, by the cloud server, authenticated external device as the one imaging device to perform the imaging task. In addition, the method includes when receiving the terminal identification of the mobile terminal and the communication parameter for communicating with the mobile terminal, verifying, by the cloud server, identity of the mobile terminal according to the terminal identification and, after the identity verification is successfully passed and according to the communication parameter, determining one imaging device, among all imaging devices that send request messages, to perform an imaging task. Further, the method includes sending, by the cloud server, an imaging job to the imaging device to perform the imaging task, and when receiving the imaging job, performing, by the imaging device, the imaging task according to the imaging job.

In one embodiment, when receiving the device identification, the request message further includes a communication parameter between the mobile terminal and the external device. The imaging method further includes when a plurality of external devices pass the verification, according to the communication parameter, determining, by the cloud server, one external device among the plurality of authenticated external devices as the one imaging device to perform the imaging task.

In one embodiment, the imaging job is stored in the cloud server in advance; or the imaging job is sent by the mobile terminal to the cloud server.

Other aspects of the present disclosure can be understood by those skilled in the art in light of the description, the claims, and the drawings of the present disclosure.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification. After the identity verification is passed, the cloud server may determine an imaging device to perform the imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, and the unique identification information of the mobile terminal may be used as a certificate for the cloud server to authorize the imaging device to perform the imaging task, which may improve the convenience of operation and the operating speed. Further, it may be ensured that the imaging task may be performed merely when the user arrives near the imaging device, the imaging task may be prevented from being performed before the user arrives at the imaging device, the imaging result may be prevented from being obtained by any other user, and the imaging information may be prevented from being leaked. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 1 illustrates a schematic flow chart of an exemplary imaging method consistent with various disclosed embodiments of the present disclosure;

FIG. 2 illustrates a schematic flow chart of another exemplary imaging method consistent with various disclosed embodiments of the present disclosure;

FIG. 3 illustrates a schematic structural diagram of an exemplary imaging device consistent with various disclosed embodiments of the present disclosure;

DETAILED DESCRIPTION

Figure 4:
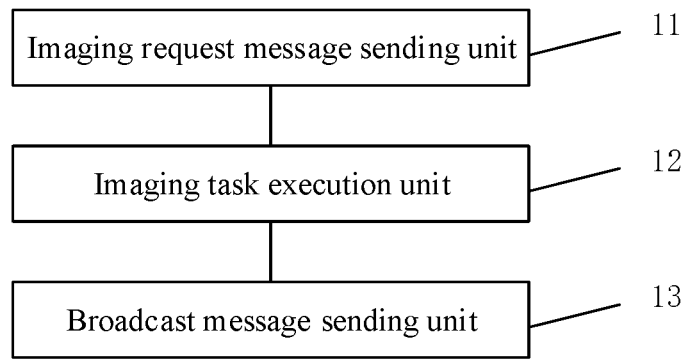
FIG. 4 illustrates a schematic structural diagram of another exemplary imaging device consistent with various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Exemplary Embodiment 1

The present disclosure provides an imaging method, which may be performed by an imaging device, and may be implemented in a form of software and/or hardware. FIG. 1 illustrates a schematic flow chart of an imaging method consistent with various disclosed embodiments of the present disclosure. Referring to FIG. 1, the imaging method may include following.

In step 101: when receiving a terminal identification sent by a mobile terminal and directed to the mobile terminal, sending, by an imaging device, an imaging request message to a cloud server, where the imaging request message includes the terminal identification and a communication parameter for communicating with the mobile terminal, used for the cloud server to verify identity of the mobile terminal according to the terminal identification and, after the identity verification is successfully passed and according to the communication parameter, to determine one imaging device, among all imaging devices that send imaging request messages, to perform an imaging task, and to send an imaging job to the one imaging device.

First, various communication methods may be used for the mobile terminal to send the terminal identification directed to the mobile terminal to the imaging device. For example, the imaging device may send out a broadcast message, when the mobile terminal approaches the imaging device and receives the broadcast message, the mobile terminal may send the terminal identification to the imaging device in a broadcast manner. One or more imaging devices may send out the broadcast message, and the mobile terminal may receive the broadcast message sent by each imaging device, and may return the terminal identification in the broadcast manner.

Alternatively, when establishing a connection with the imaging device, the mobile terminal may send the terminal identification to the imaging device. The method of establishing the connection between the mobile terminal and the imaging device may include Bluetooth, infrared, Wireless-Fidelity (WiFi) communication method, Near Field Communication (NFC) method, etc. The mobile terminal may establish a communication connection with one of the imaging devices through at least one of the above methods.

In addition, the mobile terminal may serve as a hotspot (i.e., an access point), and may transmit terminal identification thereof in the broadcast manner. The imaging device may receive the broadcast message sent by the mobile terminal to obtain the terminal identification in the broadcast message.

The above terminal identification may be a unique identification of the mobile terminal, and the terminal identification of each mobile terminal may be different. The terminal identification may be a media access control (MAC) address of the mobile terminal, or may be a factory serial number of the mobile terminal set at the factory.

Second, after at least two imaging devices receive the terminal identification sent by the mobile terminal, the at least two imaging devices may send imaging request messages to the cloud server. The imaging request message may include the terminal identification and the communication parameter for communicating with the mobile terminal. The terminal identification may be a terminal identification directed to the mobile terminal and sent by the mobile terminal. The cloud server may verify the identity of the mobile terminal according to the terminal identification. The cloud server may store a terminal identification of at least one mobile terminal in advance. If the terminal identification sent by the imaging device is the same as at least one stored terminal identification, the identity verification may be considered to be passed. If the terminal identification sent by the imaging device is different from any stored terminal identification, the identity verification may be considered to be failed.

The communication parameter for communicating with the mobile terminal may include a communication distance between the imaging device and the mobile terminal, communication signal strength, a communication responding speed, or a communication method. Further, the communication method may refer to the above-mentioned method for performing communication through broadcast, Bluetooth, infrared, WiFi, NFC, etc. Each imaging device may send the above communication parameter for communicating with the mobile terminal to the cloud server.

After the identity verification is passed, the cloud server may determine an imaging device to perform the imaging task among all imaging devices that send imaging request messages according to the communication parameter. If the communication parameter is the communication distance, the cloud server may select an imaging device having a shortest communication distance with the mobile terminal as the imaging device to perform the imaging task. If the communication parameter is the communication signal strength (e.g., the strength of the WiFi communication), the cloud server may select an imaging device having the strongest communication signal strength with the mobile terminal as the imaging device to perform the imaging task. If the communication parameter is the communication responding speed, the cloud server may determine an imaging device having a fastest responding speed (i.e., the imaging device that sends the imaging request message to the cloud server at an earliest time) as the imaging device to perform the imaging task.

If the communication parameter is the communication method, when the mobile terminal communicates with the imaging device in a broadcast manner, and the imaging request messages sent by the plurality of imaging devices and received by the cloud server all include a same terminal identification, the cloud server may determine the imaging device to perform the imaging task according to the above communication distance, communication signal strength, or communication responding speed. If the communication parameter is the communication method, when one imaging device is connected to and communicates with the mobile terminal through Bluetooth, infrared, WiFi, or NFC, and the mobile terminal also receives broadcast messages sent by other imaging devices and feeds back the terminal identification, the cloud server may directly determine the one imaging device that communicates with the mobile terminal through Bluetooth, infrared, WiFi, or NFC as the imaging device to perform the imaging task.

Specifically, when the mobile terminal establishes a WiFi connection with one imaging device, and the mobile terminal also receives broadcast messages sent by other imaging devices and feeds back the terminal identification, the cloud server may determine the imaging device that establishes the WiFi connection with the mobile terminal as the imaging device to perform the imaging task according to the content of each imaging request message. Alternatively, when the mobile terminal establishes a NFC connection with one imaging device, and the mobile terminal also receives broadcast messages sent by other imaging devices and feeds back the terminal identification, the cloud server may determine the imaging device that establishes the NFC connection with the mobile terminal as the imaging device to perform the imaging task according to the content of each imaging request message.

After determining the imaging device to perform the imaging task, the cloud server may send the imaging job to the imaging device.

In step 102: when receiving the imaging job sent by the cloud server, performing, by the imaging device, the imaging task according to the imaging job. The imaging device may perform the imaging task, e.g., printing, copying, scanning, or faxing, etc., according to the imaging job.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification. After the identity verification is passed, the cloud server may determine an imaging device to perform the imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, and the unique identification information of the mobile terminal may be used as a certificate for the cloud server to authorize the imaging device to perform the imaging task, which may improve the convenience of operation and the operating speed. Further, it may be ensured that the imaging task may be performed merely when the user arrives near the imaging device, the imaging task may be prevented from being performed before the user arrives at the imaging device, the imaging result may be prevented from being obtained by any other user, and the imaging information may be prevented from being leaked. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

Alternatively, after the identity verification is passed, the cloud server may directly send the imaging job to the first imaging device that sends the imaging request message to the cloud server.

Exemplary Embodiment 2

The present embodiment may further optimize the imaging method based on Embodiment 1. FIG. 2 illustrates a schematic flow chart of another imaging method consistent with various disclosed embodiments of the present disclosure. Referring to FIG. 2, after performing the step 102, during the process of performing the imaging task by the imaging device, the imaging method may further include following.

In step 103: sending, by the imaging device, status information of the imaging device and/or status information of the imaging task in the process of performing the imaging task to the cloud server, for the cloud server to forward the status information of the imaging device and/or the status information of the imaging task to the mobile terminal.

The status information of the imaging device may include out of paper, remaining amount of consumables, ready, system error, etc. The status information of the imaging task may include start, execution, end, imaging progress, number of pages, paper jam, etc.

The imaging device may send the above status information of the imaging device and/or status information of the imaging task to the cloud server, and the cloud server may forward the status information of the imaging device and/or status information of the imaging task to the mobile terminal. Therefore, the user may view various states of the imaging device on the mobile terminal, and, for example, may replenish in time when being out of paper, to avoid affecting the imaging progress.

In addition, the imaging request message sent by the imaging device to the cloud server may include device information of the imaging device, such that the cloud server may send the device information corresponding to the imaging device to perform the imaging task to the mobile terminal. The device information may include one or more of the name, manufacturer, location information, status information and any other information of the imaging device.

The cloud server may determine an imaging device to perform the imaging task from at least two imaging devices, and the cloud server may send the corresponding device information to the mobile terminal, such that the user may view from the mobile terminal and may know which imaging device is used to perform the imaging task. For example, three printers may be around the user, and may be distributed in different locations. By viewing on the mobile terminal, the user may know which printer has performed the printing task, and may directly go to the corresponding printer to get the printed document, thereby improving convenience.

Optionally, before sending the imaging job to the imaging device to perform the imaging task, the cloud server may send a confirmation message to the mobile terminal, and after receiving a response, the cloud server may send the imaging job to the imaging device. The confirmation message may include the name, model, location and any suitable information of the one imaging device, selected by the cloud server to send the imaging job thereto, such that the user may know the imaging device that performs the imaging job. After being confirmed by the user, the cloud server may send the imaging job, and may further provide an option for the user to select the imaging device, which may facilitate the user's demands for imaging devices.

In addition, if the user is not satisfied with the imaging device to perform the imaging task selected by the cloud server, the user may also change the selection parameter in the confirmation message, for example, may select any other imaging device that has sent the imaging request message in the confirmation message, or may select the imaging device with the nearest distance. Further, the user's selection may be sent to the cloud server, such that the cloud server may send the imaging job to an imaging device most expected to perform the imaging job according to the user's preference.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification. After the identity verification is passed, the cloud server may determine an imaging device to perform the imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, which may improve the convenience of operation and the operating speed. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

Before performing the step 101, the user may register a user account and set a login password on the cloud server through the mobile terminal, and may achieve the cloud printing service by logging in the user account on the mobile terminal.

During the registration process, the user may send the terminal identification of the mobile terminal in use to the cloud server, to the cloud server may store the terminal identification. Alternatively, when the user account is bound to the mobile terminal, the terminal identification of the mobile terminal may also be replaced by the user account. A plurality of user accounts or terminal identifications may be stored in the cloud server.

After receiving the terminal identification sent by the imaging device, the cloud server may compare the received terminal identification with the stored terminal identifications. When the terminal identification sent by the imaging device is the same as one of the plurality of stored terminal identifications, the identity verification may be considered to be passed. If the terminal identification sent by the imaging device is different from any one of the plurality of stored terminal identifications, the identity verification may be considered to be failed.

Alternatively, when the user needs to instruct the imaging device to perform the imaging task, a terminal identification may be sent to the cloud server through the mobile terminal, such that the cloud server may store the terminal identification. The cloud server may then compare the stored terminal identification with the terminal identification sent by the imaging device. If the stored terminal identification is the same as the terminal identification sent by the imaging device, the identity verification may be considered to be passed. If the stored terminal identification is different from the terminal identification sent by the imaging device, the identity verification may be considered to be failed.

In addition, the imaging job may be stored in the cloud server in advance. The user may view the imaging job stored on the cloud server through the mobile terminal, and then may select an imaging job. Then, after the cloud server determines that the identity verification is passed and selects an imaging device to perform the imaging task, the imaging job may be sent to the imaging device.

Alternatively, when the user needs to instruct the imaging device to perform the imaging task, the imaging job may be sent to the cloud server through the mobile terminal. After the cloud server determines that the identity verification is passed and selects an imaging device to perform the imaging task, the imaging job may be sent to the imaging device.

Specifically, the imaging job may include image data, copying instruction, scanning instruction, faxing instruction, and may also include a uniform resource locator (URL) address. When the imaging job includes a URL address, the cloud server may download the image data from network through the URL address, and may send the downloaded image data to the imaging device. Alternatively, when receiving the imaging job sent by the cloud server, the imaging device may download the image data from network through the URL address in the imaging job.

Exemplary Embodiment 3

FIG. 3 illustrates a schematic structural diagram of an imaging device consistent with various disclosed embodiments of the present disclosure. Referring to FIG. 3, the imaging device provided by the present embodiment may include an imaging request message sending unit 11 and an imaging task execution unit 12.

The imaging request message sending unit 11 may be configured to when receiving a terminal identification directed to a mobile terminal and sent by the mobile terminal, send an imaging request message to the cloud server. The imaging request message may include the terminal identification and communication parameter for communicating with the mobile terminal. Therefore, the cloud server may verify the identity of the mobile terminal according to the terminal identification. After the identity verification is passed, the cloud server may determine an imaging device to perform an imaging task among all imaging devices that send the imaging request messages according to the communication parameter, and may send an imaging job to the imaging device. The imaging task execution unit 12 may be configured to when receiving the imaging job sent by the cloud server, perform the imaging task according to the imaging job.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification.

After the identity verification is passed, the cloud server may determine the imaging device to perform an imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, which may improve the convenience of operation and the operating speed. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

FIG. 4 illustrates a schematic structural diagram of another imaging device consistent with various disclosed embodiments of the present disclosure. Referring to FIG. 4, on the basis of the above technical solutions, the imaging device may further include a broadcast message sending unit 13. The broadcast message sending unit 13 may be configured to send a broadcast message, such that after receiving the broadcast message, the mobile terminal may send the terminal identification to the imaging device.

Figure 5:
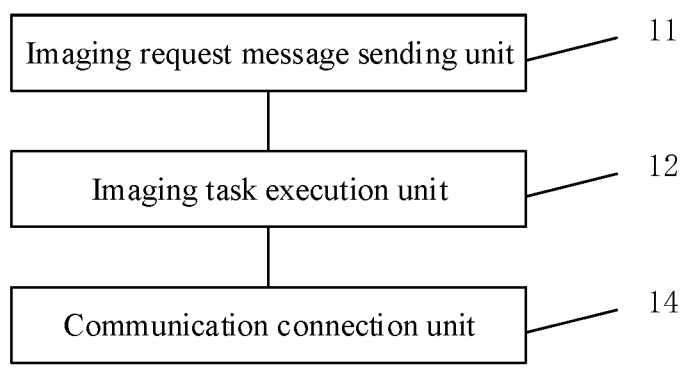
FIG. 5 illustrates a schematic structural diagram of another exemplary imaging device consistent with various disclosed embodiments of the present disclosure.

FIG. 5 illustrates a schematic structural diagram of another imaging device consistent with various disclosed embodiments of the present disclosure. In another embodiment, referring to FIG. 5, the imaging device may further include a communication connection unit 14 configured to establish a communication connection with the mobile terminal, such that the mobile terminal may send the terminal identification directed to the mobile terminal to the imaging device.

The imaging device may further include a broadcast message receiving unit (not illustrated) configured to receive the broadcast message sent by the mobile terminal, and extract the terminal identification in the broadcast message.

The above imaging device may perform the method provided by any embodiment of the present disclosure, and may have the functional units and beneficial effects corresponding to the execution method.

Exemplary Embodiment 4

Figure 6:
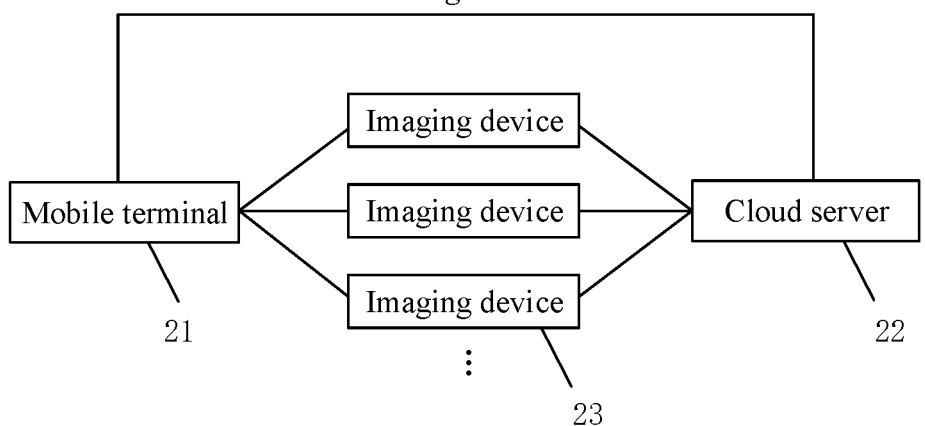
FIG. 6 illustrates a schematic structural diagram of an exemplary imaging system consistent with various disclosed embodiments of the present disclosure.

FIG. 6 illustrates a schematic structural diagram of an imaging system consistent with various disclosed embodiments of the present disclosure. Referring to FIG. 6, the imaging system provided by the present embodiment may include a mobile terminal 21, a cloud server 22, and at least two imaging devices 23 provided in any one of the foregoing embodiments.

The mobile terminal 21 may be connected to the cloud server 22 through a network (e.g., Internet, local area network, or Ethernet), and the cloud server 22 may be connected to an imaging device 23 through a network. The mobile terminal 21 may be connected to the imaging device 23 through broadcast, Bluetooth, infrared, WiFi, NFC, etc.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification. After the identity verification is passed, the cloud server may determine an imaging device to perform the imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, which may improve the convenience of operation and the operating speed. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

The above imaging system may include the device provided by any embodiment of the present disclosure, may perform the method provided by any embodiment of the present disclosure, and may have the functional units and beneficial effects corresponding to the execution method.

Exemplary Embodiment 5

Figure 7:
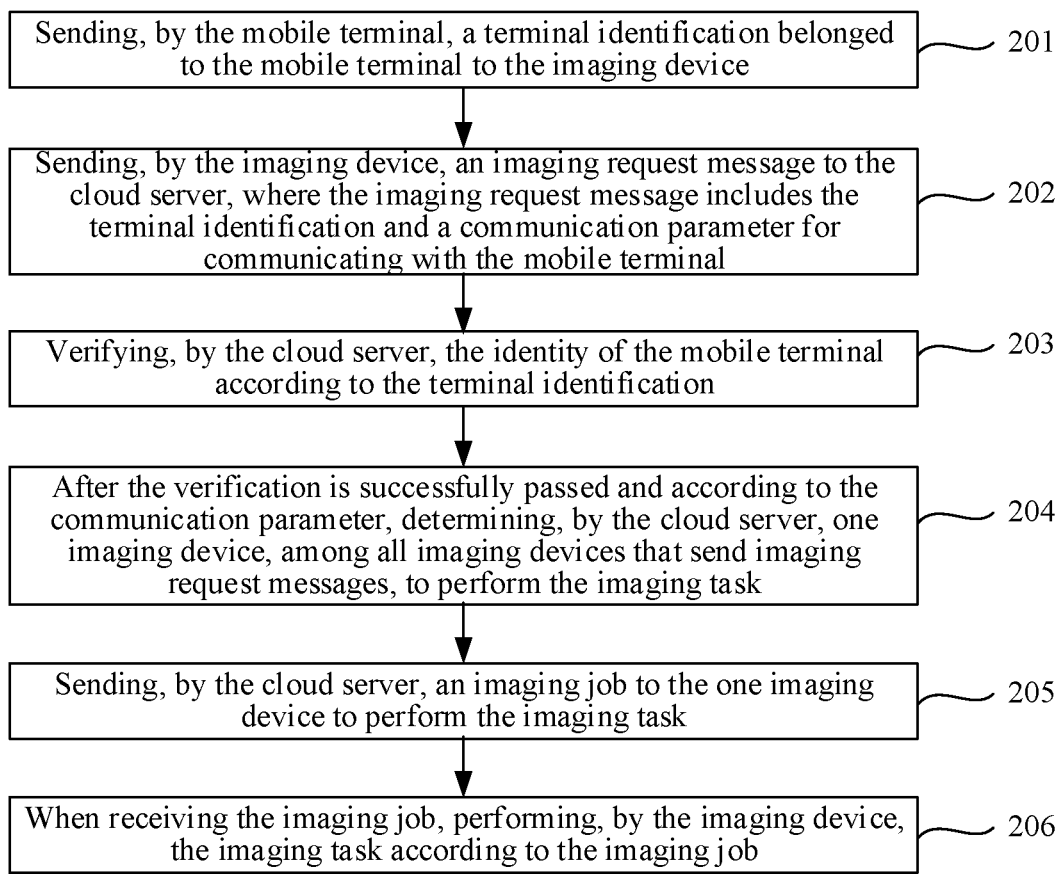
FIG. 7 illustrates a schematic flow chart of another exemplary imaging method consistent with various disclosed embodiments of the present disclosure.

FIG. 7 illustrates a schematic flow chart of another imaging method consistent with various disclosed embodiments of the present disclosure. Referring to FIG. 7, the imaging method may include the following.

In step 201: sending, by the mobile terminal, a terminal identification directed to the mobile terminal to the imaging device. The mobile terminal may send the terminal identification to the imaging device in following methods.

In method 1: after receiving the broadcast message sent by the imaging device, the mobile terminal may send the terminal identification to the imaging device in a broadcast manner. In method 2: when establishing a communication connection with the imaging device through Bluetooth, infrared, WiFi, NFC, etc., the mobile terminal may send the terminal identification to the imaging device. In method 3: the mobile terminal may serve as a hotspot, and may send out a broadcast message including the terminal identification. The imaging device may receive the broadcast message to obtain the terminal identification directed to the mobile terminal.

In step 202: sending, by the imaging device, an imaging request message to the cloud server. The imaging request message may include a terminal identification and communication parameter for communicating with the mobile terminal. The terminal identification in the imaging request message may be the terminal identification sent by the mobile terminal to the imaging device. The communication parameter for communicating with the mobile terminal may include a communication distance, communication signal strength, a communication responding speed, or a communication method. Details may refer to the foregoing embodiments, which may not be repeated herein.

In step 203: verifying, by the cloud server, the identity of the mobile terminal according to the terminal identification.

The cloud server may store the terminal identification of the mobile terminal in advance. The cloud server may compare the terminal identification sent by the imaging device with the terminal identification stored thereon to verify the identity of the mobile terminal.

In step 204: after the verification is successfully passed and according to the communication parameter, determining, by the cloud server, one imaging device, among all imaging devices that send imaging request messages, to perform the imaging task.

If the communication parameter is the communication distance, the cloud server may select an imaging device having a shortest communication distance with the mobile terminal as the imaging device to perform the imaging task. If the communication parameter is the communication signal strength, the cloud server may select an imaging device having the strongest communication signal strength with the mobile terminal as the imaging device to perform the imaging task. If the communication parameter is the communication responding speed, the cloud server may determine an imaging device having the fastest responding speed as the imaging device to perform the imaging task.

If the communication parameter is the communication method, when the mobile terminal communicates with a plurality of imaging devices in a broadcast manner, and the imaging request messages sent by the plurality of imaging devices and received by the cloud server all include a same terminal identification, the cloud server may determine the imaging device to perform the imaging task through the above communication distance, communication signal strength, or communication responding speed. When the mobile terminal is connected to and communicates with one imaging device through Bluetooth, infrared, WiFi, or NFC, and the mobile terminal also receives broadcast messages sent from other imaging devices and feeds back the terminal identification, the cloud server may directly determine the imaging device that communicates with the mobile terminal through Bluetooth, infrared, WiFi, or NFC as the imaging device to perform the imaging task.

Specifically, when the mobile terminal establishes a Bluetooth connection with one imaging device, and the mobile terminal also receives broadcast messages sent from other imaging devices and feeds back the terminal identification, the cloud server may determine the imaging device that establishes the Bluetooth connection with the mobile terminal as the imaging device to perform the imaging task according to the content of each imaging request message. Alternatively, when the mobile terminal establishes an infrared connection with one imaging device, and the mobile terminal also receives broadcast messages sent from other imaging devices and feeds back the terminal identification, the cloud server may determine the imaging device that establishes the infrared connection with the mobile terminal as the imaging device to perform the imaging task according to the content of each imaging request message.

In step 205: sending, by the cloud server, an imaging job to the one imaging device to perform the imaging task.

In step 206: when receiving the imaging job, performing, by the imaging device, the imaging task according to the imaging job.

In the technical solutions provided by the disclosed embodiments of the present disclosure, when receiving the terminal identification directed to the mobile terminal and sent by the mobile terminal, the imaging device may send the imaging request message to the cloud server. The imaging request message may include the terminal identification and the communication parameter for performing communication between the imaging device and the mobile terminal. Therefore, the cloud server may verify the identity of the mobile terminal according to the terminal identification.

After the identity verification is passed, the cloud server may determine an imaging device to perform the imaging task among all imaging devices that send the imaging request messages according to the communication parameter, and may send the imaging job to the imaging device. After receiving the imaging job sent by the cloud server, the imaging device may perform the imaging task according to the imaging job.

On the one hand, the user may no longer need to manually enter a password on the imaging device, which may improve the convenience of operation and the operating speed. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job. At the same time, in the disclosed embodiments, the unique identification information of the mobile terminal may be used as a certificate for the cloud server to authorize the imaging device to perform the imaging task. Further, it may be ensured that the imaging task performed by the imaging device is determined to be sent by the user holding the mobile terminal, to ensure the secure execution of the imaging task. Any other user who are not holding the mobile terminal cannot perform unauthorized request for the imaging device to perform the imaging task.

Figure 8:
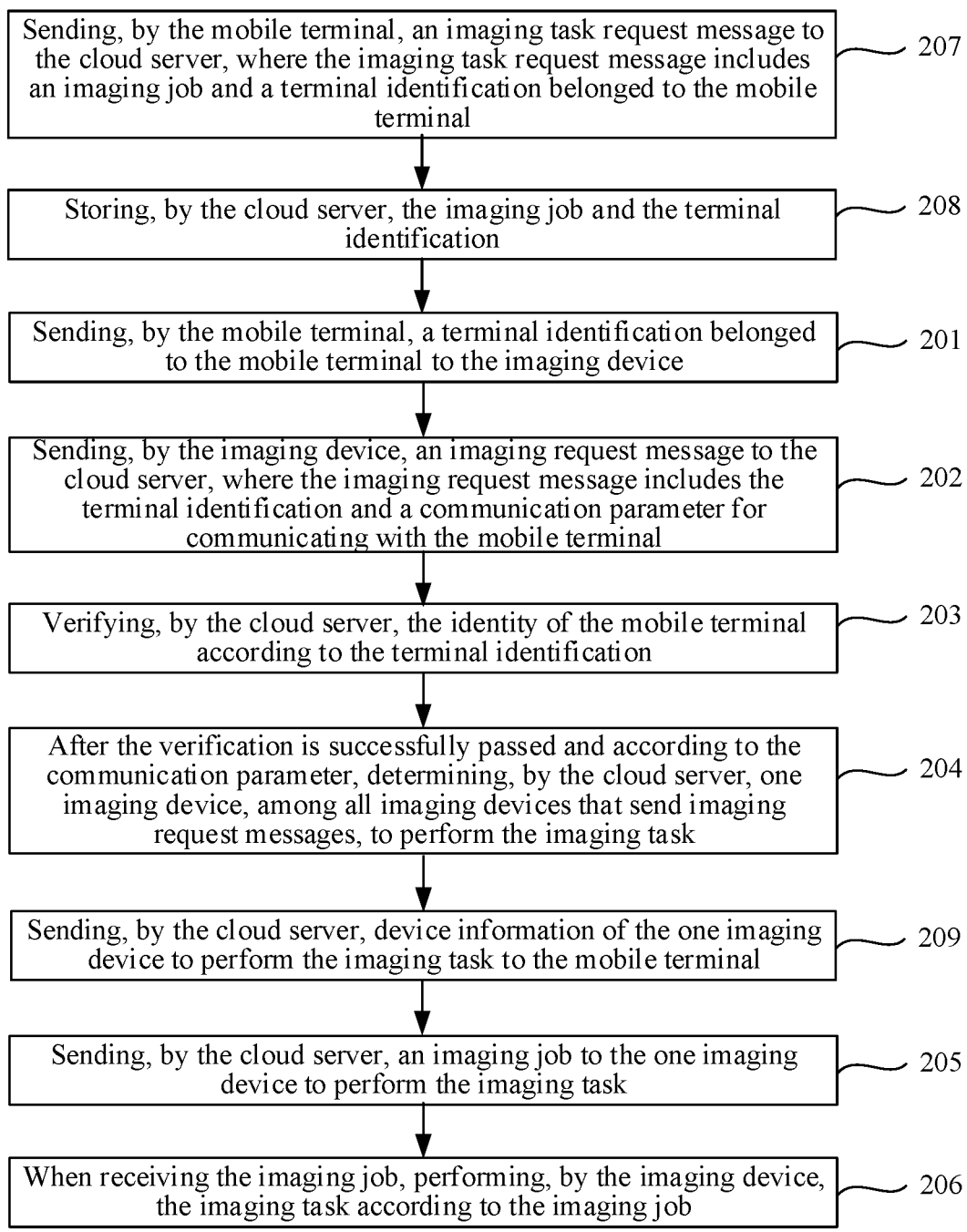
FIG. 8 illustrates a schematic flow chart of another exemplary imaging method consistent with various disclosed embodiments of the present disclosure.

FIG. 8 illustrates a schematic flow chart of another imaging method consistent with various disclosed embodiments of the present disclosure. Referring to FIG. 8, on the basis of the above technical solutions, before performing the step 201, the method may further include following two steps.

In step 207: sending, by the mobile terminal, an imaging task request message to the cloud server. The imaging task request message may include an imaging job and a terminal identification directed to the mobile terminal.

In step 208: storing, by the cloud server, the imaging job and the terminal identification.

In addition to performing the step 207 and step 208, the imaging job may be stored in the cloud server in advance instead of being sent by the mobile terminal. The user may view the public imaging job stored on the cloud server through the mobile terminal and may select an imaging job. The terminal identification may be sent to the cloud server when the user registers an account through the mobile terminal.

In addition, after performing step 204, in other words, after the cloud server determines an imaging device to perform the imaging task among all imaging devices that send imaging request messages according to the communication parameter, the method may further include following.

In step 209: sending, by the cloud server, device information of the one imaging device to perform the imaging task to the mobile terminal.

Therefore, the user may check which specific imaging device performs the imaging task on the mobile terminal, and may directly go to the corresponding imaging device to pick up the imaging document, which may improve convenience.

The step 209 may be performed before performing the step 205, or may be performed after performing the step 205, or may be performed after performing the step 206.

The above technical solutions may include that in a case where the user does not select an imaging device, the cloud server may select an imaging device to perform the imaging task. The following embodiment provides a case where the user specifies an imaging device.

Exemplary Embodiment 6

Figure 9:
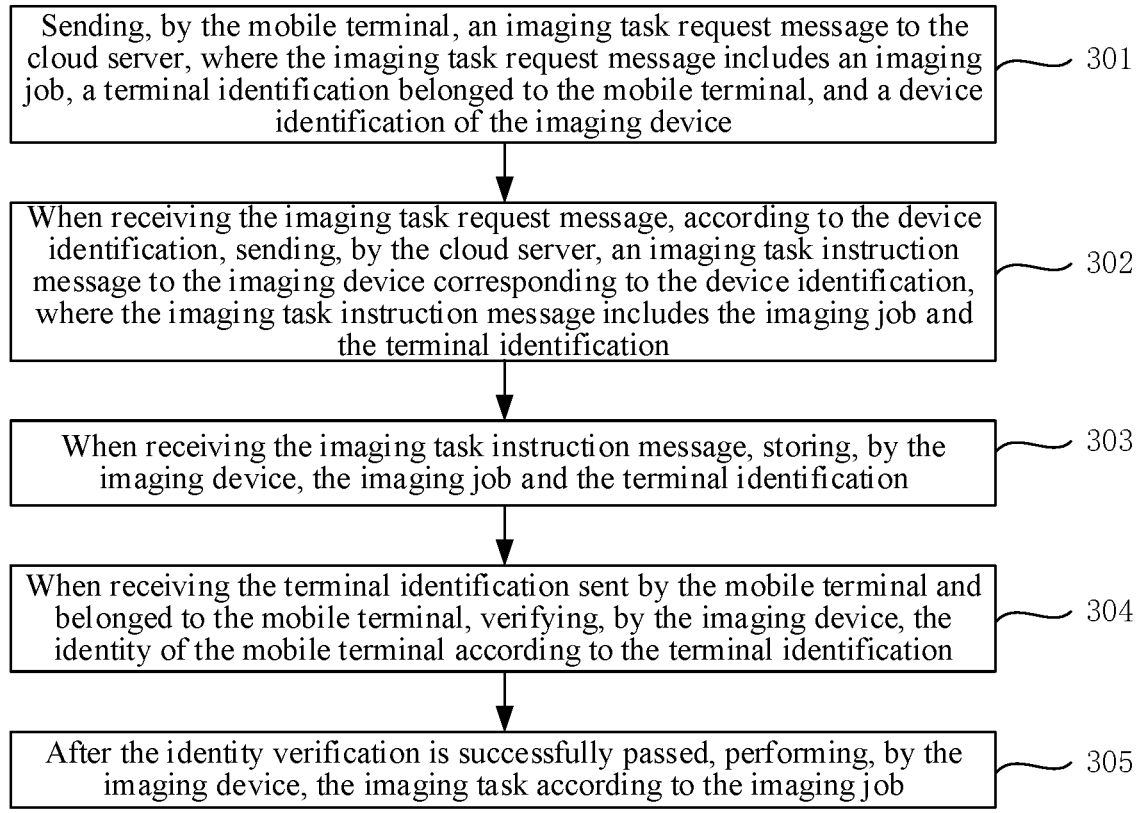
FIG. 9 illustrates a schematic flow chart of another exemplary imaging method consistent with various disclosed embodiments of the present disclosure.

FIG. 9 illustrates a schematic flow chart of another imaging method consistent with various disclosed embodiments of the present disclosure. Referring to FIG. 9, the imaging method provided by the present embodiment may include following.

In step 301: sending, by the mobile terminal, an imaging task request message to the cloud server. The imaging task request message may include an imaging job, a terminal identification directed to the mobile terminal, and a device identification of the imaging device.

The user may select one imaging device among all the imaging devices listed in the mobile terminal and may send an imaging start instruction. Then, the mobile terminal may package the imaging job, the terminal identification directed to the mobile terminal, and the device identification of the imaging device, may generate the imaging task request message, and send the imaging task request message to the cloud server. The device identification of the imaging device may include MAC address, manufacturer information, device name, device type, geographic location, function, etc. Specifically, the mobile terminal may request the device identifications of the imaging devices managed by the mobile terminal from the cloud server, and may display a list of the imaging devices on the mobile terminal to enable the user to determine an imaging device to perform the imaging task. The mobile terminal may send the imaging job, the terminal identification, and the device identification of the imaging device selected by the user to the cloud server according to the user's determination.

In step 302: when receiving the imaging task request message, according to the device identification, sending, by the cloud server, an imaging task instruction message to the imaging device corresponding to the device identification. The imaging task instruction message may include the imaging job and the terminal identification.

In step 303: when receiving the imaging task instruction message, storing, by the imaging device, the imaging job and the terminal identification.

In step 304: when receiving the terminal identification directed to the mobile terminal and sent by the mobile terminal, verifying, by the imaging device, the identity of the mobile terminal according to the terminal identification.

The imaging device may compare the terminal identification sent by the mobile terminal with the stored terminal identification sent by the cloud server. If the terminal identification sent by the mobile terminal is the same as the stored terminal identification sent by the cloud server, the identity verification may be passed. If the terminal identification sent by the mobile terminal is different from the stored terminal identification sent by the cloud server, the identity verification may be failed.

The mobile terminal may send the terminal identification directed to the mobile terminal to the imaging device in following methods.

In method 1: after receiving the broadcast message sent by the imaging device, the mobile terminal may send the terminal identification to the imaging device in a broadcast manner. In method 2: when establishing a communication connection with the imaging device through Bluetooth, infrared, WiFi, NFC, etc., the mobile terminal may send the terminal identification to the imaging device. In method 3: the mobile terminal may serve as a hotspot, and may send out a broadcast message containing the terminal identification. The imaging device may receive the broadcast message to obtain the terminal identification directed to the mobile terminal.

Specifically, when the mobile terminal sends out the imaging start instruction, the mobile terminal may correspondingly turn on the hotspot function thereof, and may send out the broadcast message containing the terminal identification. When the user holds the mobile phone and approaches the imaging device, the imaging device may receive the broadcast message sent by the mobile terminal and may obtain the terminal identification to verify the identity of the mobile terminal.

In step 305: after the identity verification is successfully passed, performing, by the imaging device, the imaging task according to the imaging job.

In the technical solutions provided by the disclosed embodiments of the present disclosure, the mobile terminal may send the imaging job, the terminal identification directed to the mobile terminal, and the device identification of the imaging device to the cloud server. According to the device identification, the cloud server may send the imaging job and the terminal identification to the imaging device corresponding to the device identification. When receiving the terminal identification directed to the mobile terminal and sent by the mobile terminal, the imaging device may verify the identity of the mobile terminal according to the terminal identification. After the identity verification is passed, the imaging device may perform the imaging task according to the imaging job. The user may no longer need to manually enter a password on the imaging device, which may improve the convenience of operation and the operating speed.

In particular, when the user holding the mobile terminal walks to the specified imaging device, the imaging device may obtain the terminal identification of the mobile terminal in the broadcast method. After verification is passed, the imaging device may directly perform the imaging job without requiring the user to operate the mobile terminal to search for imaging device and to enable the mobile terminal to establish an effective communication connection, e.g., WiFi, Bluetooth, infrared, etc., with the specified imaging device. Such effective communication connection may require a complicated key authentication process. In the present embodiment, the broadcast method may be used without establishing an effective communication connection between the mobile terminal and the imaging device, thereby saving a lot of operation time.

Exemplary Embodiment 7

Figure 10:
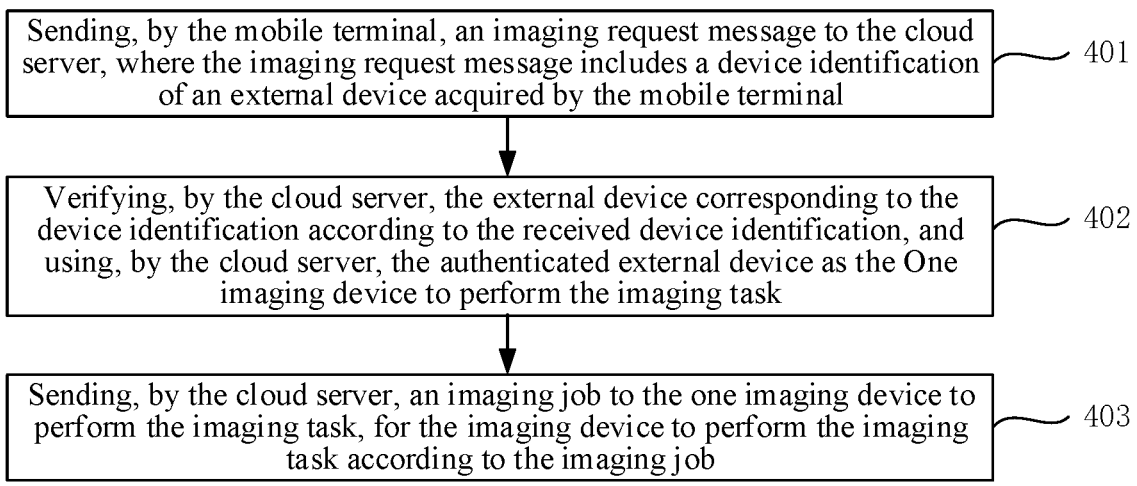
FIG. 10 illustrates a schematic flow chart of another exemplary imaging method consistent with various disclosed embodiments of the present disclosure.

FIG. 10 illustrates a schematic flow chart of another imaging method consistent with various disclosed embodiments of the present disclosure. Referring to FIG. 10, the imaging method provided by the present embodiment may include following.

In step 401: sending, by the mobile terminal, an imaging request message to the cloud server. The imaging request message may include a device identification of an external device acquired by the mobile terminal.

In step 402: verifying, by the cloud server, the external device corresponding to the device identification according to the received device identification, and using, by the cloud server, the authenticated external device as the imaging device to perform the imaging task.

In step 403: sending, by the cloud server, an imaging job to the imaging device to perform the imaging task, such that the imaging device may perform the imaging task according to the imaging job.

The specific application scenario may include when the user holds a mobile terminal to find an imaging device, a wireless unit of the mobile terminal may receive broadcast messages sent by various hotspots. The general hotspot may be a wireless router, and the imaging device may also send the broadcast message as a hotspot. The broadcast message may carry the device identification (e.g., MAC address, manufacturer information, device name, device type, geographic location, etc.) of the external device. When receiving the device identification, the mobile terminal may send the device identification to the cloud server. The cloud server may store the device identifications of the plurality of imaging devices managed by the cloud server in advance. After receiving the device identification sent by the mobile terminal, the cloud server may determine whether the device type of the external device corresponding to the device identification is an imaging device, and may verify whether the imaging device associated with the device identification is an imaging device managed by the cloud server. If merely one device identification among the plurality of device identifications sent by the mobile terminal and received by the cloud server corresponds to an external device whose device type is an imaging device, and the verification of the imaging device performed by the cloud server is passed, the cloud server may use the imaging device as the imaging device to perform the imaging task, and may send the imaging job to the imaging device to perform the imaging task.

Based on the above technical solutions, the imaging request message may further include communication parameter between the mobile terminal and the external device. The communication parameter may include communication strength, e.g., the communication signal strength between the mobile terminal and the external device. Then, the above imaging method may further include following step.

When a plurality of external devices pass the verification, the cloud server may determine one external device among the plurality of authenticated external devices as the imaging device to perform the imaging task according to the communication parameter, and may send the imaging job to the imaging device to perform the imaging task.

When the cloud server finds that a plurality of device identifications correspond to external devices whose device types are imaging devices, and the plurality of imaging devices associated with the plurality of device identifications all pass the verification, the cloud server may determine one imaging device to perform the imaging task according to the communication signal strength with the external device sent by the cloud server. In other words, when the user holding the mobile terminal approaches the plurality of imaging devices, the mobile terminal may receive the broadcast information sent by the plurality of imaging devices as hot spots, may extract the device identifications of the imaging devices, and may send the plurality of extracted device identifications and the communication signal strength with the plurality of imaging devices to the cloud server. The cloud server may determine the imaging device to perform the imaging task according to the communication signal strength, and may send the imaging job to the imaging device having the strongest communication signal strength with the mobile terminal.

Alternatively, the mobile terminal may receive the broadcast message sent by the external device, and may determine whether the external device is an imaging device according to the device identification in the broadcast message. If the external device is an imaging device, the mobile terminal may send the device identification of the external device whose device type is an imaging device to the cloud server, and the cloud server may verify the external device according to the received device identification. In other words, the cloud server may verify whether the external device is the imaging device managed by the cloud server. If the verification is passed, the cloud server may determine that the external device is the imaging device to perform the imaging task.

In addition, when the mobile terminal receives broadcast messages sent by a plurality of external devices whose device types are imaging devices, the device identifications of the plurality of external devices whose device types are imaging devices may be sent to the cloud server, and the cloud server may verify the external devices corresponding to the plurality of device identifications. When merely one external device passes the verification, the external device may be determined to be the imaging device to perform the imaging task. Alternatively, when the plurality of external devices pass the verification, in other words, when the imaging devices associated with the plurality of device identifications are all imaging devices managed by the cloud server, the cloud server may determine one external device as the imaging device to perform the imaging task among the plurality of authenticated external devices according to the communication signal strength with such external devices sent by the mobile terminal.

To ensure that the imaging device to perform the imaging task is the imaging device required by the user, after receiving a first device identification sent by the mobile terminal, the cloud server may verify the external devices corresponding to the plurality of device identifications after a predetermined time-period. In addition, the cloud server may use the imaging device associated with the last device identification sent by the mobile terminal as the imaging device to perform the imaging task.

Specifically, in step 402, according to the received device identification, the cloud server may verify the external device corresponding to the device identification. In other words, the cloud server may determine whether the external device corresponding to the device identification is an imaging device managed by the cloud server according to the device identification. The cloud server may internally store the device identification of at least one imaging device in advance, and the cloud server may compare the received device identification with the internally stored device identification. If the received device identification is consistent with at least one stored device identification, the external device corresponding to the received device identification may pass the verification. If the received device identification is not consistent with any device identification stored in the cloud server, the external device corresponding to the received device identification may not pass the verification.

Further, before sending the imaging job to an imaging device to perform the imaging task, the cloud server may send the device information of the imaging device to the mobile terminal, such that the user of the mobile terminal may know the execution destination of the imaging task. To further facilitate the user's secure printing, when notifying the mobile terminal of the device information of the imaging device to perform the imaging task, a confirmation message may be displayed on the mobile terminal. Therefore, after the user clicks confirmation, the cloud server may receive the confirmation message returned by the mobile terminal, and then may send the imaging job to the imaging device to perform the imaging task.

The imaging job may be stored in the cloud server in advance, and the user may view the imaging job stored on the cloud server through the mobile terminal, and may select an imaging job. Then, the imaging task request message may be sent to the cloud server. Alternatively, the mobile terminal may request imaging of any information on the webpage, and the mobile terminal may send the imaging task request message to the cloud server. The imaging task request message may include a webpage address, and according to the webpage address, the cloud server may download the imaging job to be stored in the cloud server.

Figure 11:
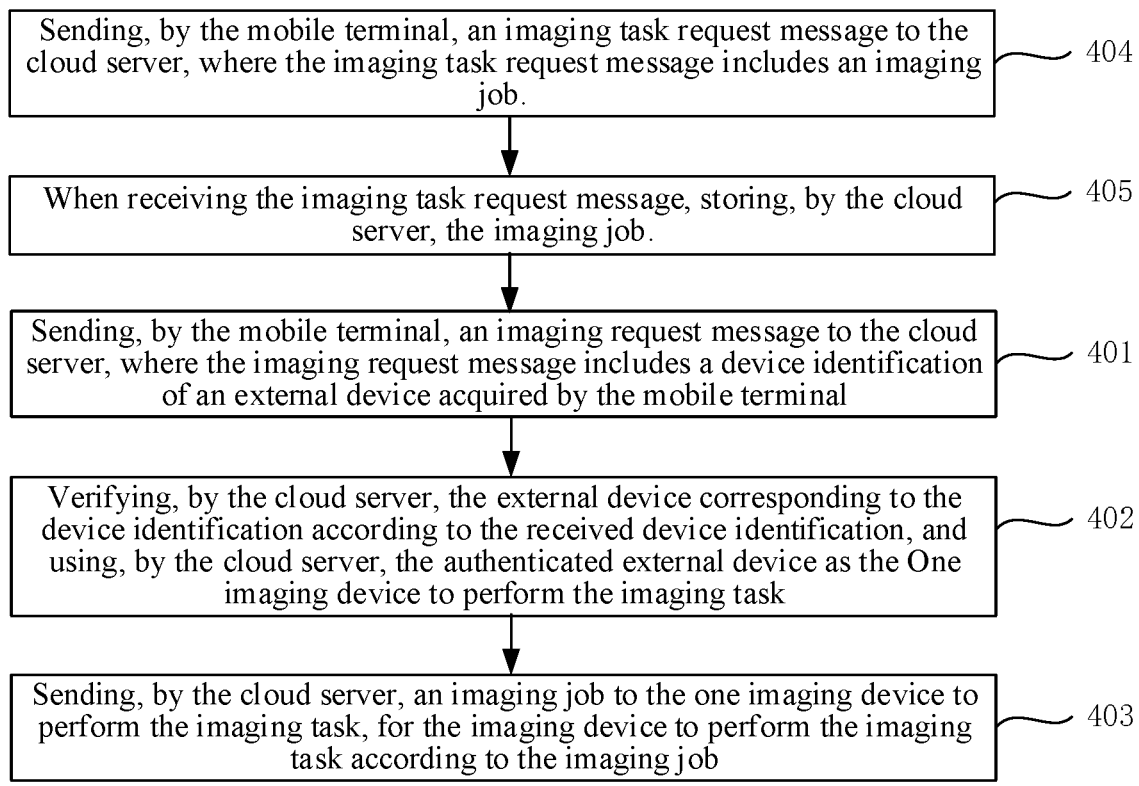
FIG. 11 illustrates a schematic flow chart of another exemplary imaging method consistent with various disclosed embodiments of the present disclosure.

Alternatively, the mobile terminal may directly send the imaging job (including image data) to the cloud server. FIG. 11 illustrates a schematic flow chart of another imaging method consistent with various disclosed embodiments of the present disclosure. Referring to FIG. 11, the imaging method may include following.

In step 404: sending, by the mobile terminal, an imaging task request message to the cloud server, where the imaging task request message may include an imaging job.

In step 405: when receiving the imaging task request message, storing, by the cloud server, the imaging job.

In the disclosed imaging method of the present embodiment, when the user performs mobile printing, the device identification of the imaging device may be used as an authorization certificate. Therefore, the user may no longer need to manually enter a password on the imaging device, or an effective communication connection between the mobile terminal and the imaging device may not need to be established, which may improve the convenience of operation and the operating speed. On the other hand, the cloud server may directly and automatically determine one imaging device according to the communication parameter, which may solve the problems that a user is often confused about which imaging device is selected among all the imaging devices in the existing technology, and the imaging device may thus be quickly started to perform the imaging job.

Those skilled in the art may understand that all or part of the steps in the above various method embodiments may be achieved by a hardware related to program instructions. The program instructions may be stored in a computer-readable storage medium. When the program instructions are executed, the steps including the above method embodiments may be performed. The storage medium may include read-only memory (ROM), random access memory (RAM), magnetic disk, optical disk, or any other appropriate medium that is capable of storing program code.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An imaging method for controlling image devices, comprising:
   in responding to receiving a terminal identification sent by a mobile terminal and directed to the mobile terminal, sending, by the imaging devices, an imaging request message to a cloud server, wherein:
   the imaging request message sent by the imaging devices includes the terminal identification and a communication parameter for communicating with the mobile terminal, used for the cloud server to verify identity of the mobile terminal according to the terminal identification and,
   after the identity verification of the mobile terminal, performed by the cloud server, is successfully passed and according to the communication parameter, the cloud server automatically determines one imaging device, among the imaging devices that send imaging request messages, to perform an imaging task, and to send an imaging job to the one imaging device; and
   in responding to receiving the imaging job sent by the cloud server, performing, by the one imaging device, the imaging task according to the imaging job.

2. The imaging method according to claim 1, wherein:
   the communication parameter includes a communication distance, communication signal strength, a communication responding speed, or a communication method.

3. The imaging method according to claim 1, before receiving the terminal identification sent by the mobile terminal and directed to the mobile terminal, further including:
   sending out, by the imaging devices, a broadcast message to enable the mobile terminal to send the terminal identification to the imaging devices after receiving the broadcast message, or
   establishing, by the imaging devices, a communication connection with the mobile terminal to enable the mobile terminal to send the terminal identification directed to the mobile terminal to the imaging devices.

4. The imaging method according to claim 1, after performing, by the imaging devices, the imaging task according to the imaging job, further including:
   sending, by the imaging devices, status information of the imaging devices and/or status information of the imaging task in the process of performing the imaging task to the cloud server, for the cloud server to forward the status information of the imaging devices and/or the status information of the imaging task to the mobile terminal.

5. The imaging method according to claim 1, wherein the imaging request message further includes:
   device information of the imaging devices, used for the cloud server to send the device information corresponding to the imaging devices to perform the imaging task to the mobile terminal.

6. An imaging device, comprising:
   a memory storing instructions; and
   a processor coupled to the memory and, when executing the instructions, configured to:
   in responding to receiving a terminal identification sent by a mobile terminal and directed to the mobile terminal, send an imaging request message to a cloud server, wherein:
   the imaging request message sent by the imaging device includes the terminal identification and a communication parameter for communicating with the mobile terminal, used for the cloud server to verify identity of the mobile terminal according to the terminal identification and,
   after the identity verification of the mobile terminal, performed by the cloud server, is successfully passed and according to the communication parameter, the cloud server automatically determines one imaging device, among all imaging devices that send imaging request messages, to perform an imaging task, and to send an imaging job to the one imaging device; and in responding to receiving the imaging job sent by the cloud server, perform the imaging task according to the imaging job.

7. The imaging device according to claim 6, further configured to:

send out a broadcast message to enable the mobile terminal to send the terminal identification to the imaging device after receiving the broadcast message; and establish a communication connection with the mobile terminal to enable the mobile terminal to send the terminal identification directed to the mobile terminal to the imaging device.

8. The imaging device according to claim 6, further configured to:

send status information of the imaging device and/or status information of the imaging task in the process of performing the imaging task to the cloud server, for the cloud server to forward the status information of the imaging device and/or the status information of the imaging task to the mobile terminal.

9. The imaging device according to claim 6, wherein the imaging request message further includes:

device information of the imaging device, used for the cloud server to send the device information corresponding to the imaging device to perform the imaging task to the mobile terminal.

10. The imaging device according to claim 6, wherein:

the communication parameter includes a communication distance, communication signal strength, a communication responding speed, or a communication method.

11. An imaging method for controlling an external device, comprising:

receiving, by a cloud server, a request message, wherein the request message includes a device identification of the external device; or a terminal identification of a mobile terminal and a communication parameter for communicating with the mobile terminal;

in responding to receiving, by the cloud server, the device identification of the external device from the mobile terminal, verifying, by the cloud server, the external device corresponding to the device identification according to the received device identification, and using, by the cloud server, authenticated the external device as one imaging device to perform an imaging task;

in responding to receiving, by the cloud server, the terminal identification of the mobile terminal and the communication parameter for communicating with the mobile terminal from the external device, verifying, by the cloud server, identity of the mobile terminal according to the terminal identification and, after the identity verification is successfully passed and according to the communication parameter, automatically determining, by the cloud server, the one imaging device, among all imaging devices that send request messages, to perform the imaging task; and sending, by the cloud server, the imaging job to the one imaging device to perform the imaging task, for the one imaging device to perform the imaging task according to the imaging job.

12. The imaging method according to claim 11, wherein:

in responding to receiving the device identification of the external device from the mobile terminal, the request message further includes a communication parameter between the mobile terminal and the external device, wherein the imaging method further includes:

in responding to that a plurality of external devices pass the verification, according to the communication parameter, determining, by the cloud server, one external device among the plurality of authenticated external devices as the one imaging device to perform the imaging task.

13. The imaging method according to claim 11, wherein:

the imaging job is stored in the cloud server in advance; or the imaging job is sent by the mobile terminal to the cloud server.

* * * * *